United States Patent [19]

Stüben et al.

[11] 4,219,320

[45] Aug. 26, 1980

[54] PREFORMING PRESS

[75] Inventors: Werner Stüben, Büchen; Rudolf Eltzschig, Geesthacht; Konrad Friedrichs, Sinzig, all of Fed. Rep. of Germany

[73] Assignee: Wilhelm Fette Gmbh, Schwarzenbek, Fed. Rep. of Germany

[21] Appl. No.: 43,222

[22] Filed: Jul. 11, 1979

[51] Int. Cl.[2] .......................... B29C 3/00; B30B 11/08

[52] U.S. Cl. .................................... 425/345; 425/259; 425/355

[58] Field of Search ............... 425/256, 259, 261, 345, 425/353, 355

[56] References Cited

U.S. PATENT DOCUMENTS

| | | | |
|---|---|---|---|
| 3,910,739 | 10/1975 | Talis et al. | 425/345 X |
| 4,118,169 | 10/1978 | Haluska | 425/256 X |
| 4,167,380 | 9/1979 | Stüben et al. | 425/259 |

*Primary Examiner*—J. Howard Flint, Jr.
*Attorney, Agent, or Firm*—Michael J. Striker

[57] ABSTRACT

The preforming press of the type having a rotary die disc cooperating with a stationary filling device including a housing provided with a filling funnel for charging the molding material, comprises cooling conduits surrounding the filling funnel and the walls of the housing to cool the molding material immediately before its compression in the die. A separate cooling device is provided for introducing cooled air into respective dies in the disc.

5 Claims, 3 Drawing Figures

PREFORMING PRESS

BACKGROUND OF THE INVENTION

This invention relates generally to die pressing, and more particularly it relates to a preforming press having a rotary die disc or matrix cooled by a cooling device and including a plurality of die borings in which the molding material is compressed by counteracting punches or rams. A filling device for feeding a molding composition into the die is arranged at the edge of the die disc and includes a housing provided with a filling funnel and, within the housing, a filling vane wheel and a dosing vane wheel.

During the operation of the preforming press of the above-mentioned type, the molding material or composition and the pressing parts are subject to heating. The heating results from the fact that the individual particles of the pellet under process come into a frictional contact with one another and also the press warms up due to the movement of its component parts. Furthermore, a heating effect takes place due to the friction of the pressed pellet against the walls of the die and also during the discharge of the completed pellet from the die.

Conventional preforming presses are unsuitable for processing materials which become unstable when exposed to heating such as, for example, material which liquefy upon heating or become pasty or viscous and cannot be, therefore, processed at a normal room temperature since the temperature increases causes the sticking of the pellets and the discharge of a completed and compressed pellet from the die is not possible in a regular manner when the temperature of the press becomes too high. The known preforming presses, moreover, have the disadvantage that in the course of processing temperature sensitive substances such as vitamins or enzymes, a considerable loss of effectiveness of these substances takes place due to the effect of the increased temperature.

The processing of other temperature-sensitive substances such as, for example sapositories shaped for anal introduction, upon which they become dissolved by the heat of the human body, or other oil or fat-containing substances such as paraafin or cocoa or chocolate-containing materials, could not hitherto been processed in conventional preforming presses for reasons stated above. To preform such thermally unstable substances, it has been necessary to employ different processing methods such as casting for example. This processing method, however, is relatively complicated and consequently costly.

Attempts have already been made to process thermally unstable materials in preforming presses in which the die disc is cooled by a cooling device including channels arranged in the body of the die disc through which the cooling liquid or gaseous agent circulates.

Such prior-art cooling device arranged in the die disc, however, has the disadvantage that moisture precipitates in the range of the die borings and impairs the quality of the processes material. Namely, when the die disc is cooled more intensively, the moisture of the ambient air precipitates in the range of the punch and on the walls of the die.

SUMMARY OF THE INVENTION

It is, therefore, a general object of the present invention to overcome the aforementioned disadvantages.

More particularly, it is an object of the invention to provide an improved preforming or die press of the aforedescribed type in which the danger of interference between the processed material and the moisture precipitating during the press operation is eliminated.

In keeping with this object and others which will become apparent hereafter, one feature of the invention resides, in the preforming press of the type described above, in the provision of an additional cooling device for the filling apparatus and in addition in providing means for admitting cooled air into the compression space in the dies.

By the effect of a continuous and strong cooling of the filling apparatus with a commercially available liquid cooling agent which circulates in a closed conduit circuit, it is possible to decrease the temperature of the molding material to such an extent that during the subsequent processing thereof the temperature increased by the compression of the material never attains a value at which the undesirable changes in consistency of the material take place. The additional cooling device is preferably in the form of conduits for the cooling agent which are arranged on the wall of the filling funnel. Still more advantageous solution is to provide also the wall of the housing for the filling and dosing vane wheels with the conduits for cooling agent whereby the cooling conduit on the funnel is interconnected with the cooling conduits on the housing.

In addition, the die disc can be provided with a ring-shaped conduit for the cooling agent which if desired can be made operative in addition to the cooling of the filling device. It is, of course, possible to employ two or more concentrically arranged ring-shaped conduits in the die disc, preferably a ring-shaped conduit at the inner side and another ring-shaped conduit at the outer side of the disc so that the die borings are cooled from two sides. Generally, to complete the additional cooling means according to this invention, it is useful when the air admitted into the pressure space in the dies is preliminarily cooled and for this purpose the preforming press of this invention is also equipped with a cooling device for this air.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
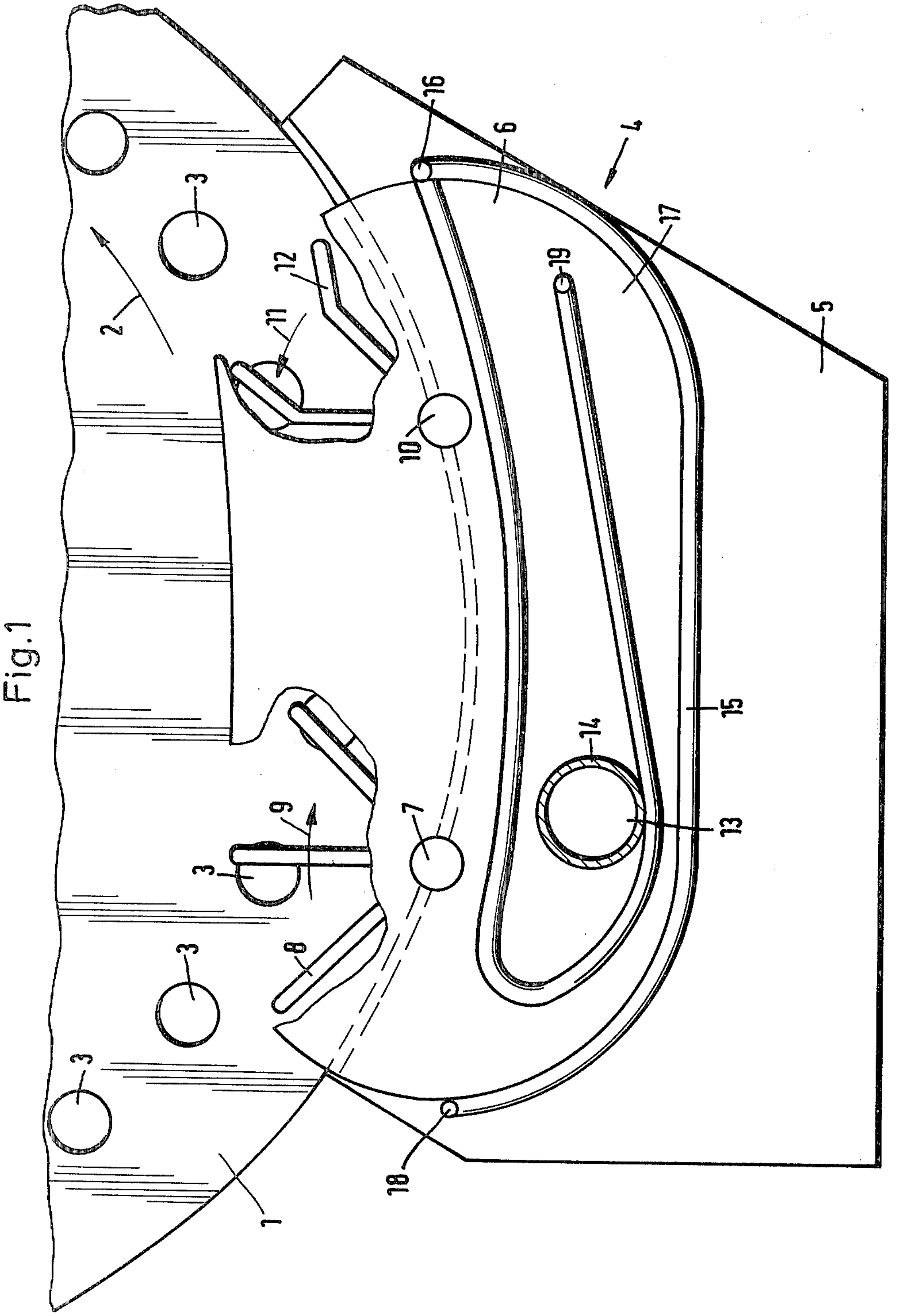
FIG. 1 is a cut-away top view of the die disc with a filling device with removed filling funnel of a preforming machine of this invention.

The preforming or die press shown in a partial view in FIG. 1 is constituted of a matrix or die disc 1 which is rotatable clockwise as indicated by arrow 2. The die disc 1 has a plurality of dies 3 arranged at regular intervals along the circumference of the disc 1. The dies 3 cooperate with non-illustrated punches which compress molding material introduced into the dies to form a pellet therein. A filling device 4 is arranged at the edge of the die disc 1 to feed the molding material into respective dies.

The filling apparatus 4 includes a bottom plate 5 which supports a housing 6. Within the housing 6, there are arranged two cooperating vane wheels, namely a filling wheel 7 with radially extending vanes 8 which rotate in clockwise direction as indicated by arrow 9, and a dosing vane wheel 10 having bent vanes 12 rotating counterclockwise in the direction of arrow 11.

During the operation of the preforming press, vanes 8 of filling wheel 7 wipe over a portion of the rotating die disc 1 and fill the molding material into successive dies 3. The subsequently arranged dosing wheel 10 wipes away excessive molding material in each die and returns this material into the working range of the filling wheel 7.

Figure 2:
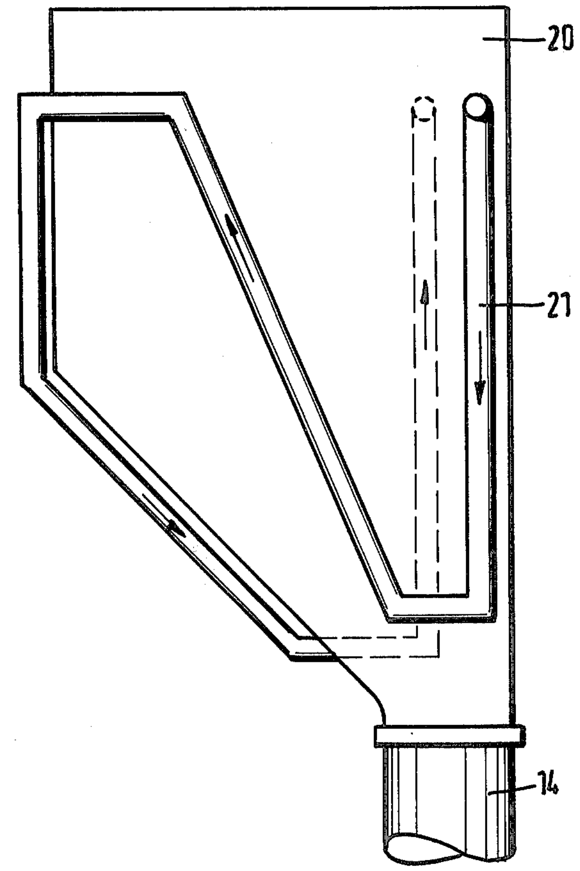
FIG. 2 is a side view of a charging funnel for the filling device in FIG. 1.

The feeding of the molding material into the housing 6 takes place through an intake opening 13 which is connected by means of a short tubular piece 14 with a funnel illustrated in FIG. 2.

In order to decrease the temperature of the molding material to a low value immediately before its treatment in the dies, there is provided conduit 15 for a cooling agent. The conduit 15 is supported on the vertical outer wall of the housing 6 and is directed upwardly and turns at the point 16 onto the top or cover wall 17 of the housing 6 so that not only the side wall but also the top wall of the housing are cooled. The cooling medium flows in at the opening 18 and leaves the conduit at the outlet opening 19.

An additional cooling of the molding material takes place inside the funnel 20 (FIG. 2) which is normally connected to the tubular connecting piece 14 to form a part of the housing 6 as shown in FIG. 1. A further cooling conduit or hose 21 is provided on the outer walls of the funnel 20. The conduit 21 is shaped to form a meander-like configuration surrounding three walls of the funnel.

Figure 3:
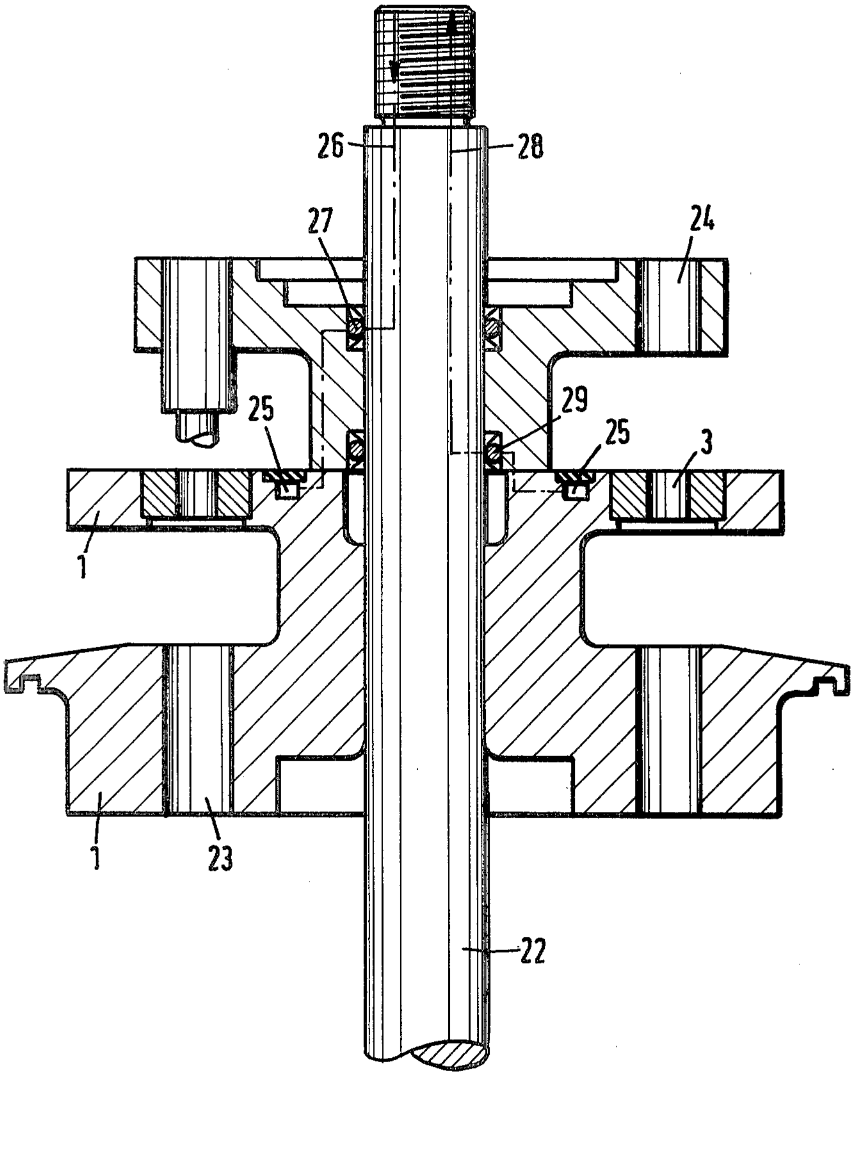
FIG. 3 is a sectional side view of a die disc having a cooling device.

FIG. 3 shows the rotary die disc 1 with die borings 3 rotating about a stationary vertical axle 22. Below and above the dies 3 there are provided lower and upper guiding passages 23 and 24 for the lower and upper punches. To cool the molding material by means of a liquid cooling agent, there is provided an annular ring 25 concentrically arranged around the axle 22 and extending in close proximity to the inner wall portions of respective dies 3. This annular channel 25 is connected to the inlet conduit 26 via another annular or ring-shaped channel 27 and to the outlet or return conduit 28 via still another ring-shaped channel 29 adjoining the axle 22 below the channel 27.

The intake conduit 26 for the cooling liquid is arranged in axle 22 and feeds the cooling liquid from above whereas the discharge of the cooling liquid through the return conduit 28 is directed upwardly. The direction of the circulation of the cooling liquid can of course be reversed and the inlet and outlet conduits 26 and 28 can be arranged in the axle 22 as two coaxial passages.

A further improvement of the cooling device can be achieved by providing cooling channels both in the die disc and in the two discs with guiding passages for the upper and lower punches or still another cooling conduit in respective punches. Similarly, it is advantageous when the two discs supporting the punches at both sides of the die disc 1 and other parts of the preforming press are cooled by different cooling circuits which are separated from one another. If, for example, the die disc 1 is cooled more than the molding granulated material in the range of the filling funnel 20 so it is possible by separate cooling circuits to adjust accurately the desired cooling conditions for any kind of the molding material.

It will be understood that each of the elements described above, or two or more together, may also find a useful application in other types of constructions differing from the types described above.

While the invention has been illustrated and described as embodied in a cooling device of preforming presses, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A preforming machine, comprising a rotary die disc with a plurality of dies; punching means cooperating with the dies; first means for cooling said die disc; filling means fixedly arranged at the periphery of said disc for feeding a molding material into said dies, said filling means including a housing with an intake funnel and, within said housing, a filling vane wheel and a dosing vane wheel; and additional cooling means arranged on said filling means for cooling said molding material.

2. The machine as defined in claim 1, further including means for admitting cooling air into said dies.

3. The machine as defined in claim 1, wherein said additional cooling means includes a cooling conduit supported on the wall of said filling funnel.

4. The machine as defined in claim 3, wherein said additional cooling means includes a cooling conduit supported on the walls of said housing of said filling means.

5. The machine as defined in claim 4, wherein said cooling conduit on said filling funnel and on said housing are interconnected.

* * * * *